(12) United States Patent
Mizoguchi (10) Patent No.: US 10,102,672 B2
(45) Date of Patent: Oct. 16, 2018

(54) STORAGE MEDIUM, INFORMATION PROCESSING APPARATUS AND CONTROL METHOD

(71) Applicant: SQUARE ENIX CO., LTD., Tokyo (JP)

(72) Inventor: Hidemi Mizoguchi, Tokyo (JP)

(73) Assignee: SQUARE ENIX CO., LTD., Tokyo (JP)

( * ) Notice: Subject to any disclaimer, the term of this patent is extended or adjusted under 35 U.S.C. 154(b) by 0 days.

(21) Appl. No.: 15/065,052

(22) Filed: Mar. 9, 2016

(65) Prior Publication Data

US 2016/0275717 A1 Sep. 22, 2016

(30) Foreign Application Priority Data

Mar. 16, 2015 (JP) ................................ 2015-052750
Mar. 7, 2016 (JP) ................................ 2016-043912

(51) Int. Cl.
| | | |
|---|---|---|
| *G06T 19/00* | (2011.01) | |
| *A63F 13/577* | (2014.01) | |
| *A63F 13/5255* | (2014.01) | |
| *A63F 13/5258* | (2014.01) | |

(52) U.S. Cl.
CPC .......... *G06T 19/00* (2013.01); *A63F 13/5255* (2014.09); *A63F 13/5258* (2014.09); *A63F 13/577* (2014.09); *G06T 2210/62* (2013.01)

(58) Field of Classification Search
None
See application file for complete search history.

(56) References Cited

U.S. PATENT DOCUMENTS

| | | | |
|---|---|---|---|
| 5,566,280 A | 10/1996 | Fukui et al. | |
| 2004/0157662 A1* | 8/2004 | Tsuchiya | A63F 13/10 463/32 |
| 2007/0262987 A1* | 11/2007 | Ahn | G06T 17/00 345/424 |
| 2013/0225289 A1* | 8/2013 | Yoshimitsu | A63F 13/10 463/31 |

FOREIGN PATENT DOCUMENTS

JP 07-085312 3/1995

* cited by examiner

*Primary Examiner* — Yi Wang (74) *Attorney, Agent, or Firm* — Greenblum & Bernstein, P.L.C.

(57) ABSTRACT

An information processing apparatus determines whether a background object is included in a predetermined volume defined between a viewpoint position for rendering a scene and a reference object that is a reference for rendering; and if it determines that the background object is included in the predetermined volume, changes the viewpoint position to a viewpoint candidate position defined based on the background object. Also, the apparatus determines whether a character object exists in a predetermined range from a viewpoint position for rendering the scene, and sets, for a target character object determined to exist in the predetermined range from the viewpoint position a transparency of the target character object overall.

12 Claims, 9 Drawing Sheets

STORAGE MEDIUM, INFORMATION PROCESSING APPARATUS AND CONTROL METHOD

BACKGROUND OF THE INVENTION

Field of the Invention

The present invention relates to a storage medium, an information processing apparatus, a control method, and particularly to a technique for controlling a viewpoint parameter that becomes a reference for rendering of a 3D scene.

Description of the Related Art

In recent years, techniques that render a three-dimensional (3D) scene as computer graphics (CG) have been used in various fields, and these are not limited to the field of computerized games. In these CG, rendering objects are located in a 3D scene by reflecting parameters such as predetermined positions or orientations, and are generated by rendering the scene for a particular viewpoint.

Incidentally, there is game content in which a desired viewpoint position is selectably configured in accordance with manipulation by a player. In such content, a gaze point is set such that a character, which is a manipulation target for example, is captured in an angle of view, and a player can perform game play by screens rendered in accordance with a viewpoint position that is changed so as to move in an outer circumference of the character. However, there are cases in which depending on the changed viewpoint position there is an object that occludes a gaze point, and there is the possibility that a screen that is not suitable for a player is presented. Japanese Patent Laid-Open No. H07-085312 discloses a technique that changes to a viewpoint position with which it is possible to capture a subject if a straight line that connects a reference point (a gaze point), which is determined so that it is easy to refer to the subject which is designated so as to be captured in an angle of view, and a viewpoint is obstructed by an obstacle.

However, because the technique recited in Japanese Patent Laid-Open No. H07-085312 does not move the viewpoint if the straight line that connects the gaze point and the viewpoint is not obstructed by an obstacle, there is a case such as the following in which a screen not suitable for a player is presented.

Figure 9A:
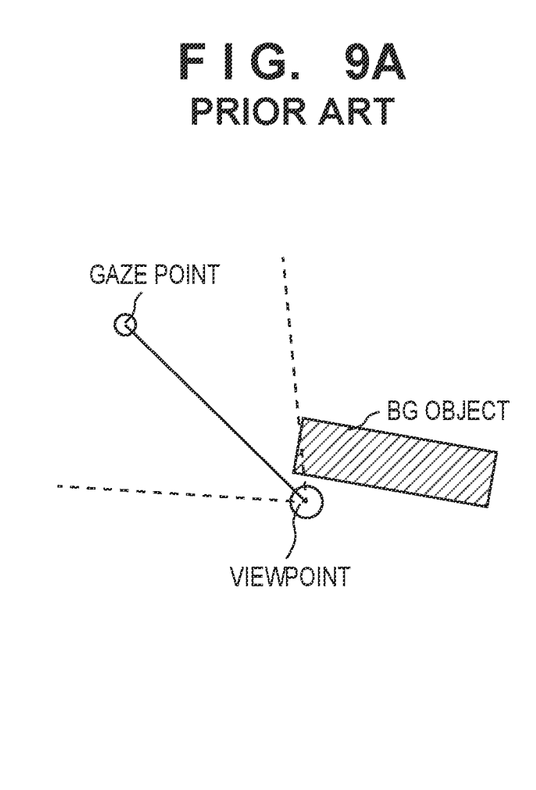
FIGS. 9A and 9B are views for explaining a situation that could occur in the prior art and could make suitable game play difficult.
Figure 9B:
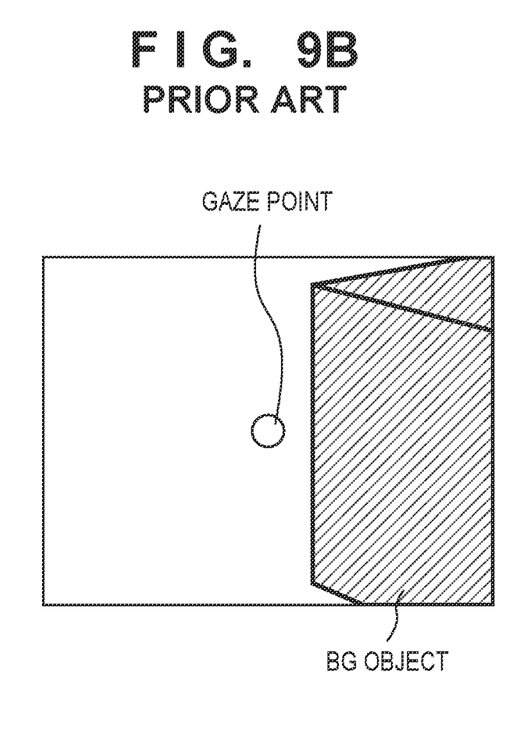

For example, if there is a background (BG) object at a position close to a viewpoint as illustrated in FIG. 9(a), because the straight line that connects the gaze point and the viewpoint is not obstructed, a change of the viewpoint is not performed by the technique recited in Japanese Patent Laid-Open No. H07-085312 in a screen rendered for such a viewpoint, but this results in a screen in which a large region of the screen is occupied by a BG object as illustrated by FIG. 9(b) is output. In other words, such a screen is not something configured such that a player can grasp the state of the rightward direction of the screen, and there is the possibility of giving the player with an impression that the screen is not such that game play can be performed suitably.

In addition, in a case in which there is a relation between a viewpoint and a BG object such as in FIG. 9(a), there is the possibility that due to a portion of vertices not being included in an angle of view due to a configuration of model data of the BG object, a screen of a broken rendering expression such as one in which a plane configured to include these vertices is not rendered and the inside of the BG object appears as transparent, will be presented.

Meanwhile, even in a case of moving a viewpoint if a straight line connecting the viewpoint and a gaze point is obstructed by an obstacle as in Japanese Patent Laid-Open No. H07-085312, in game content in which a character object that is not a target of manipulation by a player is located in a vicinity of a manipulation target character object, such as in a so-called three-dimensional action game in particular, there are cases in which a screen that is not suitable for a player is presented.

By the technique recited in Japanese Patent Laid-open No. H07-085312, for example if a character object present behind a manipulation target character object is determined to be an obstacle, a viewpoint position is changed to a position at which occlusion by the character object does not occur. However, in game content such as a three-dimensional action game, a viewpoint change to a position such that it becomes impossible to see a battle opponent character object that is located in the vicinity of a manipulation target character object has the possibility of resulting in an obstruction to game play.

SUMMARY OF THE INVENTION

At least one embodiment of the present invention is something conceived in view of at least one of the above points at issue, and provides a storage medium, an information processing apparatus, and a control method that provide a suitable screen that considers, in accordance with a viewpoint, attributes of rendering objects located in a scene.

The present invention in its first aspect provides a non-transitory computer-readable storage medium storing a program that causes a computer connected to a renderer for rendering a screen in which objects are located in a scene to execute: processing of obtaining a viewpoint position for rendering the scene; first determination processing of determining whether a background object is included in a predetermined volume defined between the obtained viewpoint position and a reference object that is a reference for rendering; and processing of changing, if the background object is determined to be included in the predetermined volume by the first determination processing, the viewpoint position to a viewpoint candidate position defined based on the background object.

The present invention in its second aspect provides a non-transitory computer-readable storage medium storing a program that causes a computer connected to a renderer for rendering a screen in which objects are located in a scene to execute: processing of obtaining a viewpoint position for rendering the scene; processing of determining whether a character object exists within a predetermined range from the obtained viewpoint position; and processing of setting, for a target character object determined to exist within the predetermined range from, the viewpoint position by the processing that determines, a transparency for the target character object overall.

The present invention in its third aspect provides an information processing apparatus connected to a renderer for rendering a screen in which objects are located in a scene, the apparatus comprising: an obtainer which is able to obtain a viewpoint position for rendering the scene; a determiner which is able to determine whether a background object is included in a predetermined volume defined between the viewpoint position obtained by the obtainer and a reference object that is a reference for rendering; and a changer which is able to change, if the background object is determined to be included in the predetermined volume by the determiner, the viewpoint position to a viewpoint candidate position defined based on the background object.

The present invention in its fourth aspect provides an information processing apparatus connected to a renderer for rendering a screen in which objects are located in a scene, the apparatus comprising: an obtainer which is able to obtain a viewpoint position for rendering the scene; a determiner which is able to determine whether a character object exists within a predetermined range from the viewpoint position obtained by the obtainer; a setter which is able to set, for a target character object determined by the determiner to exist within the predetermined range from the viewpoint position, a transparency for the target character object overall.

The present invention in its fifth aspect provides a method of controlling an information processing apparatus connected to a renderer for rendering a screen in which objects are located in a scene, the method comprising: a step of obtaining a viewpoint position for rendering the scene; a step of determining whether a background object is included in a predetermined volume defined between the obtained viewpoint position and a reference object that is a reference for rendering; and a step of changing, if the background object is determined to be included in the predetermined volume by the step of determination, the viewpoint position to a viewpoint candidate position defined based on the background object.

The present invention in its sixth aspect provides a method of controlling an information processing apparatus connected to a renderer for rendering a screen in which objects are located in a scene, the method comprising: a step of obtaining a viewpoint position for rendering the scene; a step of determining whether a character object exists within a predetermined range from the obtained viewpoint position; and a step of setting, for a target character object determined in the step of determining to exist within the predetermined range from the viewpoint position, a transparency for the target character object overall.

Further features of the present invention will become apparent from, the following description of exemplary embodiments (with reference to the attached drawings).

DESCRIPTION OF THE EMBODIMENTS

First Embodiment

Exemplary embodiments of the present invention will be described hereinafter in detail, with reference to the accompanying drawings. Note, in the embodiment described below, explanation is given of an example in which the present invention is applied to a game console, as an example of an information processing apparatus, that comprises a rendering unit for rendering a screen in which a rendering object is laid out in a scene according to game content. However, the present invention is not limited to a device that integrally comprises an apparatus having a screen rendering function in which the rendering objects are located in a scene, and can also be applied to any device, to which the device having the function is directly or indirectly connected, that has a hardware resource that is used for either computation or data retention.

In addition, in the present specification, the term "PC" indicates a Player Character to which an operation control is directly performed in accordance with manipulation performed by a player on a manipulation input interface; the term "NPC" differs from a PC and refers to a Non-Player Character, which is an ally character that performs actions together with a PC, an enemy character that is a battle opponent of a PC, or the like, to which either operation control is not performed based on manipulation performed by a player or operation control is indirectly performed in accordance with manipulation performed by a player. Below, explanation is given in which, from rendering objects located in a scene that is a rendering target, a rendering object that corresponds to a PC or an NPC is referred to as a "character object", and, excluding character objects, rendering objects that correspond to a building, terrain, or another object are on the whole referred to as "background (BG) objects".

<Configuration of Game Console 100>

Figure 1:
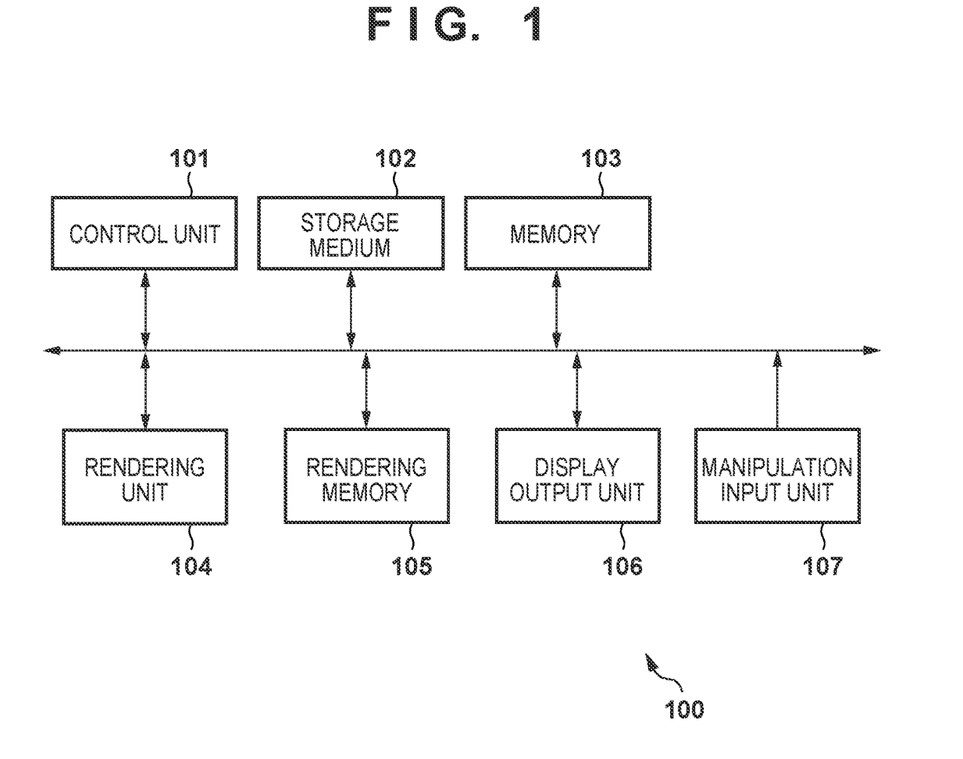
FIG. 1 is a block diagram for illustrating a functional configuration of a game console 100 according to embodiments of the present invention.

FIG. 1 is a block diagram, for showing a functional configuration of a game console 100 according to embodiments of the present invention.

A control unit 101 is for example a CPU or the like, controls operation of each block that the game console 100 has, and executes processing in accordance with game content that is provided. The control unit 101 performs an operation corresponding to operation control of each block or a provision of game content by reading out an operation program, or a game program of each block, for example recorded in a storage medium 102, loading it to a memory 103 and executing it.

The storage medium 102 is a recording apparatus, for example a non-volatile ROM integrated in the game console 100, an HDD detachably connected to the game console 100, a recording medium that can be read when inserted into an optical drive, or the like. The storage medium 102 records not only the operation program, and the game program of each block that the game console 100 has, but also various parameters, data of a rendering object, or the like, required for an operation of each block. Rendering object data has model data, texture data, a rendering program such, as a shader in association with an object ID which is identification, information, for identifying an object uniquely for example.

The memory 103 is a volatile memory, for example. The memory 103 is used not only for loading of an operation program, or a game program of each block, but also for a storage region for temporarily storing intermediate data outputted in an operation of each block and various information defined in an execution of a game program. In the present embodiment, explanation is given, so as to clearly distinguish the memory 103 and a later described rendering memory 105 from respective characteristics.

A rendering unit 104 is a rendering apparatus, for example a GPU for performing various computations corresponding to rendering and game screen generation for presenting to an external display apparatus as a final output. The rendering unit 104 reads out and loads the required rendering object data into the rendering memory 105 which may be for example, a GPU memory, performs rendering applying required computations, and generates a game screen for every frame.

A display output unit 106 is a display output interface that the game console 100 has, and can output game screens generated by the rendering unit 104 to a connected display apparatus (not shown) at a predetermined timing, and perform, a provision of game content to a player. A display apparatus existing as an external unit of the game console 100 may be connected to the game console 100 by wire or wirelessly, and may be installed integrally inside a housing of the game console 100.

A manipulation input unit 107 is a user interface which the game console 100 has such as a game pad, a keyboard, a mouse, or the like, for example. The manipulation input unit 107 analyzes a manipulation input from the player received by these various user interfaces, and transmits a corresponding control signal to the control unit 101. Alternatively, the manipulation input unit 107 notifies an occurrence of an event corresponding to the analyzed manipulation input to the control unit 101.

<Viewpoint Parameter Determination Processing>

Figure 2:
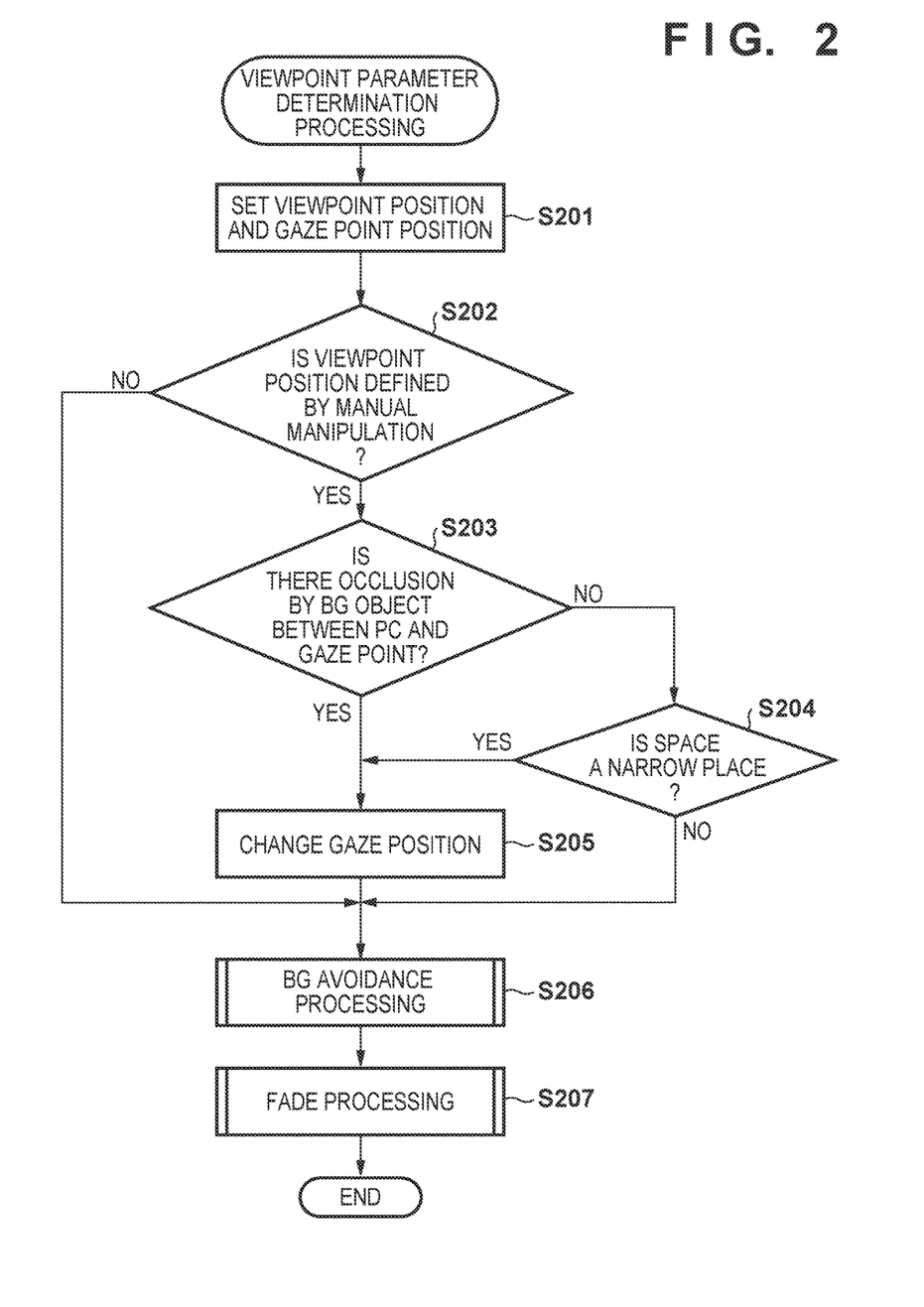
FIG. 2 is a flowchart for showing an example of processing for determining a viewpoint parameter that is executed in the game console 100 according to embodiments of the present invention.

For viewpoint parameter determination processing which determines a viewpoint parameter for a screen to render and is executed by the game console 100 of the present embodiment having this kind of configuration, explanation is given of detailed processing using the flowchart of FIG. 2. Processing corresponding to this flowchart can be realized by the control unit 101 for example reading a corresponding processing program stored in the storage medium 102, loading it into the memory 103, and executing it. Note that the viewpoint parameter determination processing is explained as something that is started when a 3D scene, which is a play field of the content, is constructed by various rendering objects being located after starting play of game content, for example, and thereafter is executed upon screen generation for every frame. For simplicity, in the following explanation, a PC position and a gaze point position are explained as being defined by having the same height coordinate.

Figure 3:
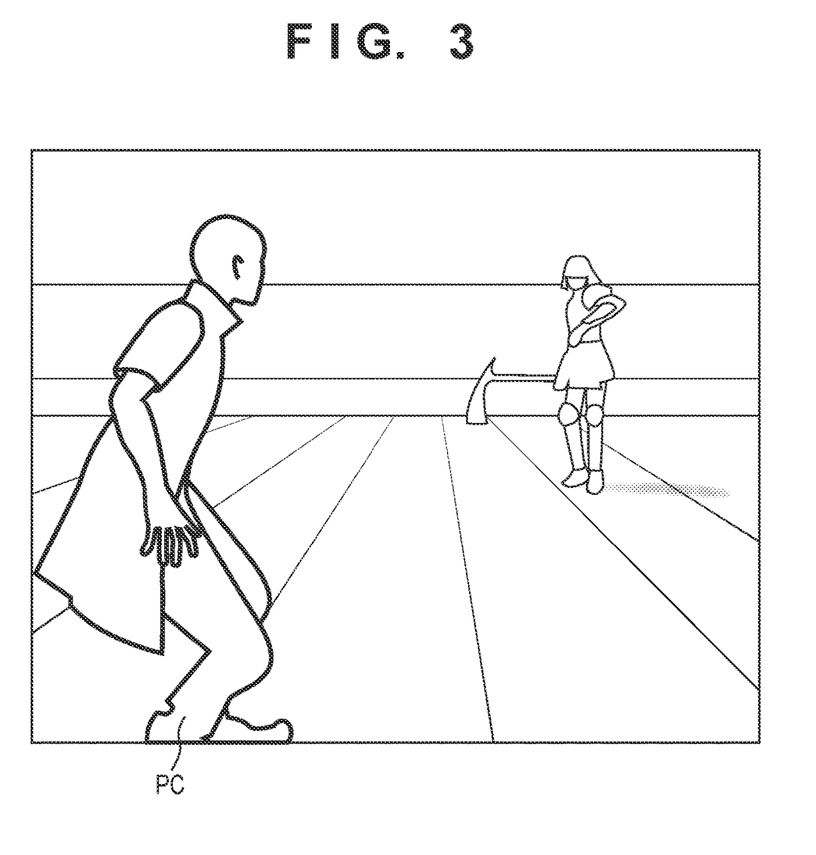
FIG. 3 is a view for showing an example of a screen configuration of a game screen ordinarily presented in a game content item according to embodiments of the present invention.

In step S201, the control unit 101 sets a viewpoint position and a gaze point position. In game content executed in the game console 100 of the present embodiment, if a manual viewpoint position change in accordance with a player manipulation input is not performed, a screen, such as that of FIG. 3 in which a PC which is a manipulation target is shifted in a horizontal leftward direction from a screen center so that it is possible to see from, behind the PC in a direction of forward movement (a front direction) of the PC while capturing the PC in the angle of view, is output as a game screen in accordance with normal viewpoint control. In other words, the control unit 101 sets the gaze point position, to a predetermined height of a position shifted in a horizontally rightward direction as seen from a viewpoint, essentially with the PC as a reference. Meanwhile, aside from a manual viewpoint position change complying with a manipulation input in accordance with a viewpoint movement of a player, the viewpoint position is configured so that the control unit 101 controls the viewpoint position so as to approach the foregoing normal game screen, with the manipulation input corresponding to movement of the PC as a reference. Consequently, in this step the control unit 101 sets, by storing in the memory 103, for example, a viewpoint position defined by either a direct change to the viewpoint position by a manual manipulation or an indirect change to the viewpoint position accompanying a movement manipulation of the PC, and a gaze point position defined with the viewpoint position as a reference, as the original viewpoint and gaze point position for the current frame. Because the original viewpoint position is used in viewpoint control even in subsequent frames, it is something that is held in the memory 103, and is managed separately from a viewpoint position that is actually used in screen rendering. In other words, the viewpoint position of step S201 to the later described step S206 is determined while successively changing the original viewpoint position. Note that, even after the change of the original viewpoint position is performed in this step, at the least the original viewpoint position for the previous frame, and PC position information and the viewpoint position used in the screen rendering of the previous frame are things that are held during the viewpoint parameter determination processing for the current frame.

In step S202, the control unit 101 determines whether the set viewpoint position is a viewpoint position directly defined by a manual manipulation. The determination of this step may be determined based on whether a manipulation input for a predetermined viewpoint change has been performed. The control unit 101 moves the processing to step S203 in cases where it determines that the set viewpoint position is a viewpoint position that is directly defined by a manual manipulation, and advances the processing to step S206 in cases where it determines that the set viewpoint position is a viewpoint position that is defined by other processing.

In step S203, the control unit 101 determines whether there is occlusion by a BG object between the PC and the gaze point. In the present embodiment a BG object is set to something for which a collision detection volume for collision determination is predetermined, and in various determinations, whether there is occlusion by the BG object is determined based on a collision determination with the collision detection volume. By a raycast function that defines a straight line that is directed from, the PC position to the gaze point position, the control unit 101 obtains whether there is a collision in accordance with a collision detection volume on a ray that is cast, and if there is a collision, a distance from the origin of the ray to the collision, position. The control unit 101 moves the processing to step S205 in cases where it determined that there is occlusion by a BG object between the PC and the gaze point, and moves the processing to step S204 in cases where it determined that there was no occlusion by a BG object.

Figure 4:
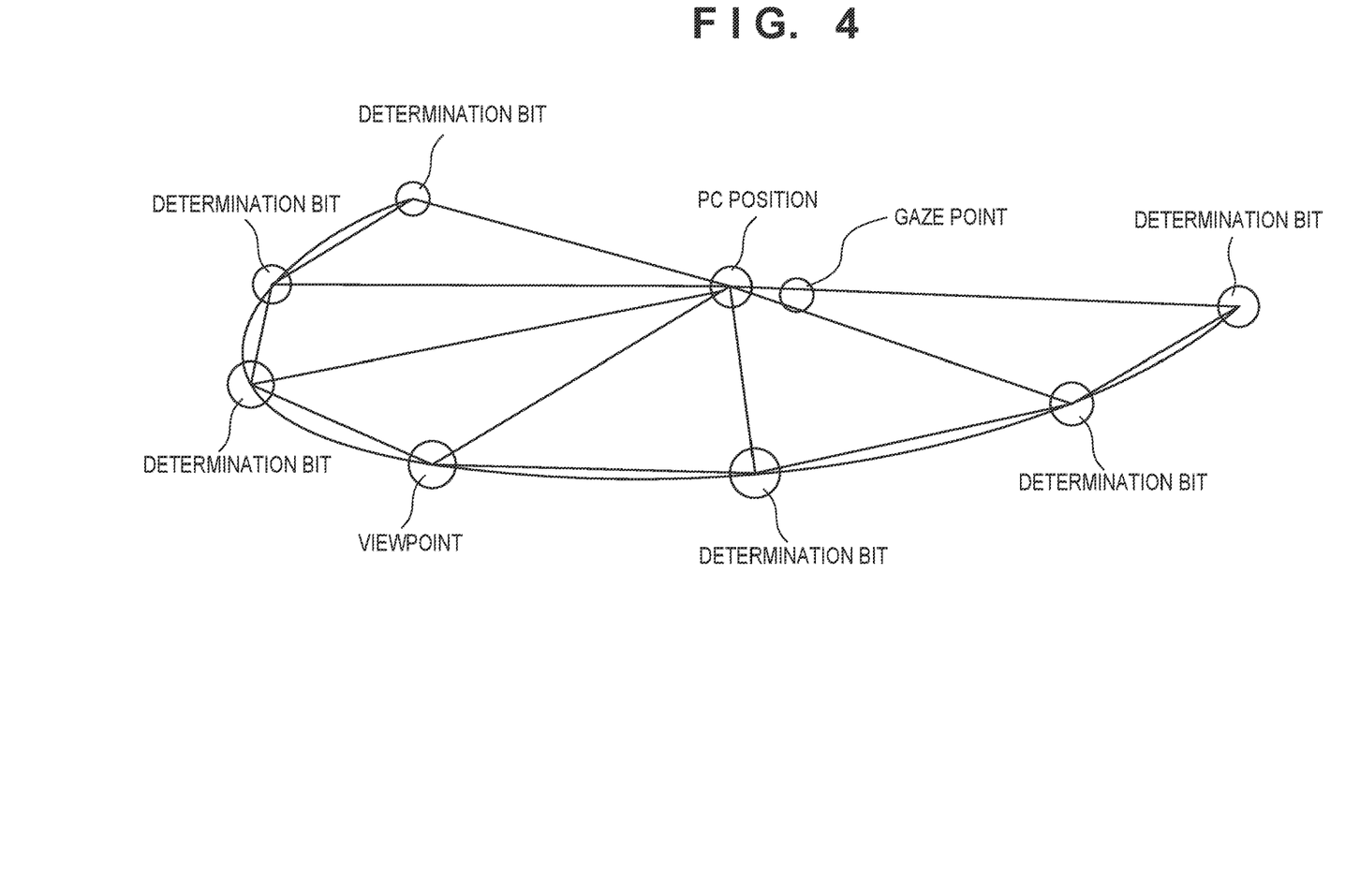
FIG. 4 is a view for explaining locating of a determination BIT according to embodiments of the present invention.

In step S204, the control unit 101 determines whether the space in which the current viewpoint is located is a narrow place. In the present embodiment a narrow place is not just a space, such as a cave for example, in which a width between walls present on each of left and right horizontal directions of the viewpoint is less than a predetermined distance; a space for which a distance from a viewpoint position to a wall present in either of the left-right horizontal directions is close, and movement of the viewpoint in that direction can be restricted is also determined as a narrow place. For the determination of whether a space is a narrow place, the control unit 101 sets a straight line in a vertical direction virtually defined at the PC position as an axis of revolution, and defines, as determination BITs, six points defined by rotation in 30-degree increments in each of the left and right directions in a horizontal orientation (three points in each direction) from the viewpoint position on a track of an arc having a radius made to be between the PC position and the viewpoint position as in FIG. 4. The control unit 101 determines whether there is a collision between a collision detection volume of a predetermined size defined centered on a respective determination BIT and a collision detection volume of a BG object; if it determines that any two determination BITs have collided with a BG object, it determines that the space in which the current viewpoint is located is a narrow place. The control unit 101 moves the processing to step S205 in cases where it determines that the space in which the current viewpoint is located a narrow place, and advances the processing to step S206 in cases where it determines that it is not a narrow place.

In step S205, the control unit 101 changes the gaze point position. In step S203, if there is an occlusion by a BG object between the PC and the gaze point, it means that the gaze point is located within the BG object. This is not desirable because the BG object will be focused on if the game screen is rendered in such a situation, and so the control unit 101 changes the gaze point position to a position that exists outside of the BG object and is close to the PC position. In addition, even if the space is determined to be a narrow place in step S204, because similar circumstances may be reached in accordance with a movement manipulation of the PC by the player, the control unit 101 changes the gaze point to a position close to the PC in accordance with a distance to a BG object, for example.

In step S206, the control unit 101 executes BG avoidance processing for avoiding BG objects that can be impediments to a field of vision between the PC and the viewpoint.

<BG Avoidance Processing>

Figure 5:
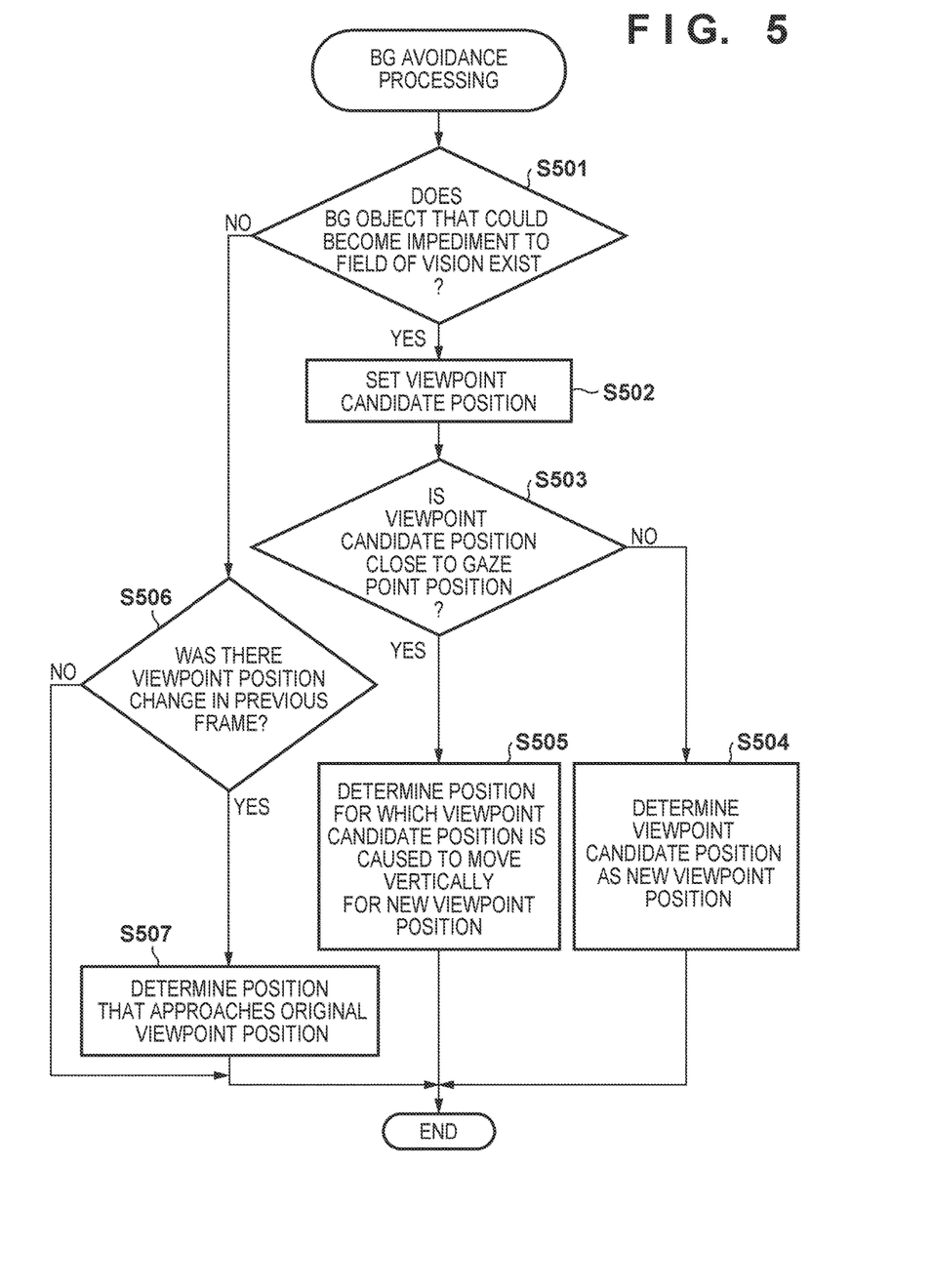
FIG. 5 is a flowchart for showing an example of BG avoidance processing according to embodiments of the present invention.

Here, the flowchart of FIG. 5 is used to explain detail of the BG avoidance processing.

In step S501, the control unit 101 determines whether a BG object that can be an impediment to the field of vision is present in a predetermined volume defined between the PC position and the viewpoint position. For simplicity in the present embodiment, the control unit 101 simply determines whether a BG object exists in a predetermined volume by determining whether a BG object is present on an edge, which extends in a direction from the PC position→the viewpoint position of a quadrangular prism defined between the PC position and the viewpoint position. Because rendering of a screen is performed for a truncated four-sided pyramid defined by the viewpoint, the angle of view, and the near plane (the near clipping plane), a rectangle that expands the rectangle of the near plane is made to be a reference for the quadrangular prism defined here in order to detect a BG object that can intrude in the truncated four-sided pyramid, for example. Specifically, it can be defined by defining an expanded rectangular plane with the PC position as a reference such that a vector from the PC position→the viewpoint position becomes a normal (the PC position is included in the plane), and extending the rectangular plane in the normal direction. In the present embodiment, to perform determination simply, four raycasts are performed in a PC position→viewpoint position direction, from coordinates of a vertex of the rectangular plane defined with the PC position as a reference to the plane of the viewpoint position, and the control unit 101 performs the determination of this step in accordance with whether or not there is an occlusion by a BG object on each ray. The control unit 101 moves the processing to step S502 in cases where it determines that a BG object that could be an impediment to the field of vision is present, and advances the processing to step S506 in cases where it determines that a BG object is not present.

In step S502, the control unit 101 sets, as a candidate position for viewpoint movement (a viewpoint candidate position) to avoid a BG object that could become an impediment to the field of vision, coordinates, from the four raycasts performed in step S501, at which a collision with the collision detection volume of a BG object at a position closest from the origin has been detected.

In step S503 the control unit 101 determines whether the viewpoint candidate position is closer to the gaze point position than a predetermined distance. In this step, it is determined whether or not the situation is such that it is not possible to present a suitable viewpoint between the PC position and the BG object due to the viewpoint position being close to the gaze point position when it is placed at the viewpoint candidate position; in other words there is the possibility that the PC will not fit within the angle of view, that the PC could occupy a large portion in a screen generated for the viewpoint position, or that the PC and the viewpoint position could touch. The control unit 101 advances the processing to step S505 in cases where it determines that the viewpoint candidate position is closer to the gaze point position by more than the predetermined distance. In addition, if the control unit 101 determines that the viewpoint candidate position and the gaze point position are separated by more than the predetermined distance, in step S504 it determines the viewpoint candidate position as a new viewpoint position for the screen rendering of the present frame, and completes this BG avoidance processing.

Figure 6:
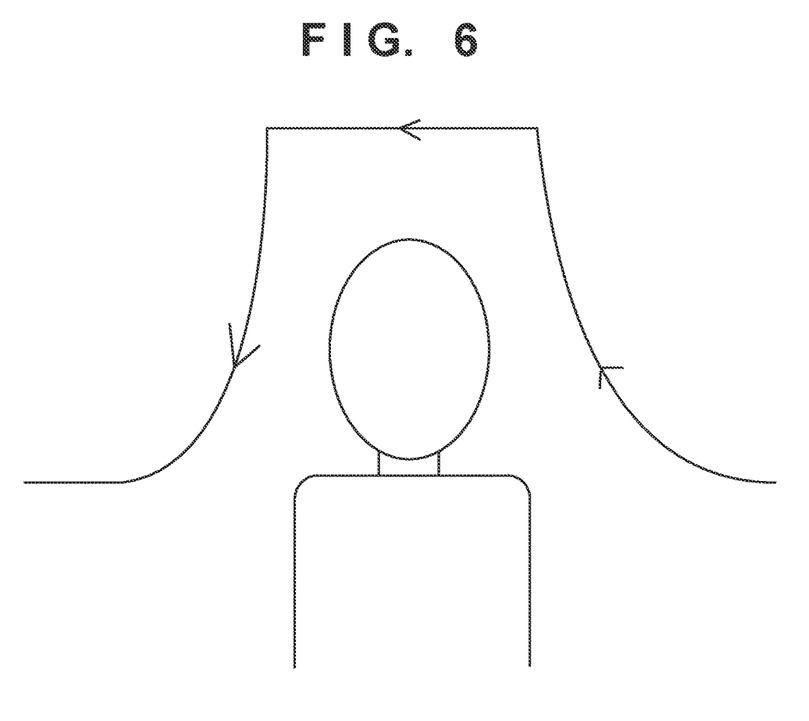
FIG. 6 is a view for exemplifying a transition of a movement of a viewpoint candidate position for a case in which a vertical motion is performed in a vertical direction according to embodiments of the present invention.

In step S505, to prevent getting too close to the PC position by avoiding a BG object that can be an impediment to the field of vision, the control unit 101 determines, as a new viewpoint position for the screen rendering of the present frame, a position by causing the viewpoint candidate position to move in a vertically upward direction in accordance with a distance between the PC position and the viewpoint candidate position, and completes the BG avoidance processing by causing the distance to the PC to separate. Here, when a movement is made by performing interpolation processing so that the movement in the vertical upward direction is a smooth movement and a screen is presented, the control unit 101 also similarly moves the gaze point position in the vertical upward direction to maintain the vector of the viewpoint candidate position→the gaze point position, so that the player does not lose his sense of direction due to a change in the angle which is not based on a viewpoint change manipulation. Note that, because there is a possibility that a viewpoint position for rendering will penetrate a PC object in accordance with a positional relationship between the PC position and a BG object if such a movement of the viewpoint candidate position in the vertical direction is caused to linearly move in accordance with the distance between the PC position and the viewpoint candidate position, vertical motion may be controlled such that the movement in the vertical direction becomes sharp as illustrated in FIG. 6, for example.

Meanwhile, if it is determined in step S501 that there is no BG object that can be an impediment to the field of vision, in step S506 the control unit 101 determines whether the distance between the PC position and the viewpoint position for screen rendering of the previous frame is smaller than the distance between the PC position and the original viewpoint position for the previous frame; in other words whether, in the previous frame, a viewpoint position change for avoidance of a BG object that could be an impediment of the viewpoint was performed. If the control unit 101 determines that a viewpoint position change for avoidance of a BG object has been performed in the previous frame, in step S507 it calculates by interpolation processing a position that approaches in a direction that returns to the original viewpoint position for the present frame, determines the calculated position as the new viewpoint position for screen rendering of the present frame, and completes the present BG avoidance processing. Note that, if it is determined that the position calculated in step S507 that approaches the original viewpoint position may be caused to converge, configuration may be taken to determine the original viewpoint position to be used unchanged. In addition, control may be performed so that if the position calculated to approach the original viewpoint position indicates an inside of a BG object, it is not caused to move, or it is changed to a position that further approaches the original viewpoint position to avoid the BG object.

In addition, if it is determined that a viewpoint position change for avoidance of a BG object that could be an impediment to the viewpoint in the previous frame was not performed in step S506, the control unit 101 may set the original viewpoint position of the present frame as something to be used in rendering unchanged, and complete this BG avoidance processing.

By BG avoidance processing with such a configuration, the control unit 101 moves the processing to step S207 of the viewpoint parameter determination processing, after determining the viewpoint position for screen rendering of this frame based on processing that includes a determination of whether or not a BG object that could be an impediment for the field of vision is present.

In step S207, the control unit 101 executes fade processing that determines a parameter for rendering of a character object that is present close to the viewpoint position for the screen rendering of the present frame.

<Fade Processing>

Figure 7:
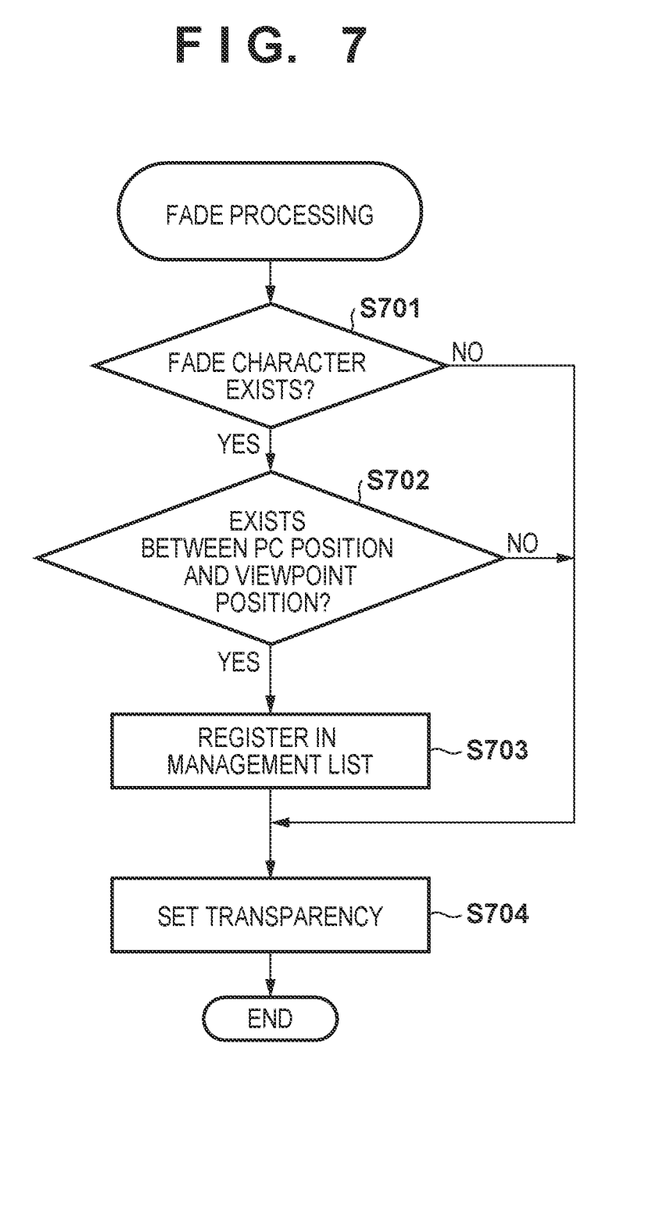
FIG. 7 is a flowchart for showing an example of fade processing according to embodiments of the present invention.

Below, the fade processing of the present embodiment is explained in detail using the flowchart of FIG. 7.

In step S701, the control unit 101 determines the existence or absence of a character object which is close to the viewpoint position, and for which rendering in the screen rendering of this frame should be considered. In the present embodiment, for a character object that exists near the viewpoint position in this fashion, although the character is rendered on the screen so as to be recognizable to a player, the transparency of the character object is controlled (caused to fade) so that visual perceptibility of the PC is not impeded and so that rendering in which an interior or the like of the character object is noticeable is not performed. Regarding a determination of a character object for which rendering should be considered (a fade character), the determination is made by considering a spherical collision detection volume, which is determined for each character object, for fade determination of a characteristic that is different to that of a BG object. The control unit 101, by using a spherecast function, performs the determination of this step of whether or not there is a character object that enters within a sphere that has a radius of a predetermined distance and is defined centered on the viewpoint position for the screen rendering of this frame, that is an existence/absence of a point at which the collision detection volume for fade determination and the sphere collide. The control unit 101 moves the processing to step S702 in cases where it determines that a fade character is present, and advances the processing to step S704 in cases where it determines that a fade character is not present.

In step S702, the control unit 101 determines whether the fade character detected in the determination in step S701 is a character present between the PC position and the viewpoint position. Because the collision detection volume for fade determination is defined based on the size of the target character, there is the possibility that a character or the like defined as something for which an overall length is larger than that of a PC, for example, is determined as a fade character, even if it is present at a position further separated from the viewpoint position than the PC position, depending of a distance between the PC position and the viewpoint position, and a distance between the PC position and the character. In this step, determination to exclude a character object that should not be determined as a fade target in such an original positional relationship is performed. The control unit 101 moves the processing to step S703 in cases where it determines that the detected fade character is a character present between the PC position and the viewpoint position, and advances the processing to step S704 in cases where it determines that it is a character present at a position further separated from the viewpoint position than from the PC position.

In step S703, the control unit 101 registers the fade character detected in the determination in step S701 in a management list that manages it as a fade target. In step S704, the control unit 101 sets a transparency for fade processing for the fade character registered in the management list, and completes the fade processing. So as to avoid the transparency suddenly changing, the fade character transparency for the fade processing of the present embodiment may be defined in accordance with a distance between the viewpoint position and the target the fade character, as well as a radius of the collision detection volume for fade determination of that fade character, and is controlled so as to change in accordance with a change of the position relation between the character and the viewpoint position, as well as the passage of time. In addition, for a character whose presence is intended to be notified to a player, such as an ally character or an enemy character, a maximum value of the transparency is restricted to a predetermined value, in other words the transparency that is set is controlled so as not to enter a completely transparent state.

In addition, for the fade processing according to the present embodiment, to avoid an unnatural rendering expression, such as where only a portion of sites of a character object for example are transparent, a transparency that is determined for a fade character is applied at a rendering time for the fade character overall. In addition, because a character object is something rendered integrally with objects that are caused to belong to it, such as its equipment or a vehicle that appears, if a character-object that has a subordinate-superior relationship is set as a fade character, the control unit 101 controls, at a time of a rendering instruction to the rendering unit 104, so as to avoid an unnatural rendering expression, by rendering that similarly applies a uniform, transparency, even to objects that have such a dependency relationship.

By performing the fade processing in this way, it is possible to control such that unlike for a BG object, rendering is not excluded for a character object entering within the field of vision by its positional relationship with the viewpoint position for the screen rendering of this frame, an appropriate transparency is set therefor, and it is rendered on a screen.

As explained above, the information processing apparatus of the present embodiment can provide a suitable screen that considers attributes of a rendering object located in a scene in accordance with a viewpoint.

Second Embodiment

In the above described embodiment, explanation was given having a viewpoint candidate position be arranged, in a case where it is determined that a BG object that could become an impediment to the viewpoint in the BG avoidance processing, at a position closer to the PC than that object, and essentially determining, for the viewpoint candidate position or a position based on the viewpoint candidate position, a viewpoint position for screen rendering of a frame; however, implementation of the present invention is not limited to this.

For example, if the BG object determined to nave the possibility of becoming an impediment of the field of vision is an object of a shape that extends simply in a vertical direction and whose width in a horizontal direction is relatively short, such as a pole or a signboard, there is a nigh probability that the player can easily cause a state in which he can see by bypassing that BG object by causing the character to move or causing the viewpoint position to move. That is, if a BG object determined to have the possibility of becoming an impediment in the field of vision is of this kind of shape, even if a viewpoint movement closer to the PC position from the object is made, there is the possibility that an unnatural fluctuation in the viewpoint will arise by the movement of the character or the movement of the viewpoint being performed, and a non-suitable screen transition will be presented to the player. Consequently, in the present embodiment, the following processing is performed between the processing of step S501 and step S502 of the BG avoidance processing in order to avoid a non-suitable screen transition being presented to the player.

To determine, for a BG object that has the possibility of becoming an impediment in the field of vision, whether it is possible to cancel, by a bypassing viewpoint movement, a state in which the field of vision is impeded, determination BITs used in step S204 of the viewpoint parameter determination processing is used. Because the determination BITs are something that are located on a trajectory of an arc that passes through the viewpoint position and is centered at the PC position as described above, by performing a raycast directed from each determination BIT toward the PC position, it can be determined whether it is possible to see the PC from each BIT according to whether there no collision with a BG object. Also, it is possible to determine whether or not it is possible to perform, a bypassing viewpoint movement for both left and right horizontal directions according to whether there is no collision with a BG object in a raycast with an adjacent determination BIT in the trajectory of the arc or the viewpoint position. Note that because a change of the viewpoint position must be performed in a state in which the original viewpoint position, itself enters a BG object, the control unit 101 may complete the BG avoidance processing using the original viewpoint position unchanged without performing the processing from step S502 in the BG avoidance processing if it is determined that there is no collision in any of the foregoing raycasts performed setting each determination BIT as the origin except in such a state.

With this, even if the BG object is determined to have the possibility of becoming an impediment of the field of vision, it is possible to control such that an unnatural viewpoint position fluctuation does not occur due to a character movement or a viewpoint movement thereafter.

Third Embodiment

In the above described first and second embodiments, explanation was given for examples in which viewpoint position control is performed in accordance with a relation simply between the viewpoint position and the BG object, but the present invention may further perform control of movement of the viewpoint position considering visibility of the PC position from, the viewpoint position, in a case where a battle with an enemy character is performed. For example, particularly in a case where the situation has become such that a large-type enemy character, or the like, exists closer to the viewpoint position than the PC position, there is the possibility that the player will fall into a situation in which he cannot see the PC and therefore cannot determine what kind of operation to perform. Accordingly, viewpoint control in a case where such a state is fallen into may be implemented by the control unit 101 executing the enemy character avoidance processing of FIG. 8 if it is determined that there is a state of battle with the enemy character after step S206 of the viewpoint parameter determination processing, for example.

<Enemy Character Avoidance Processing>

Figure 8:
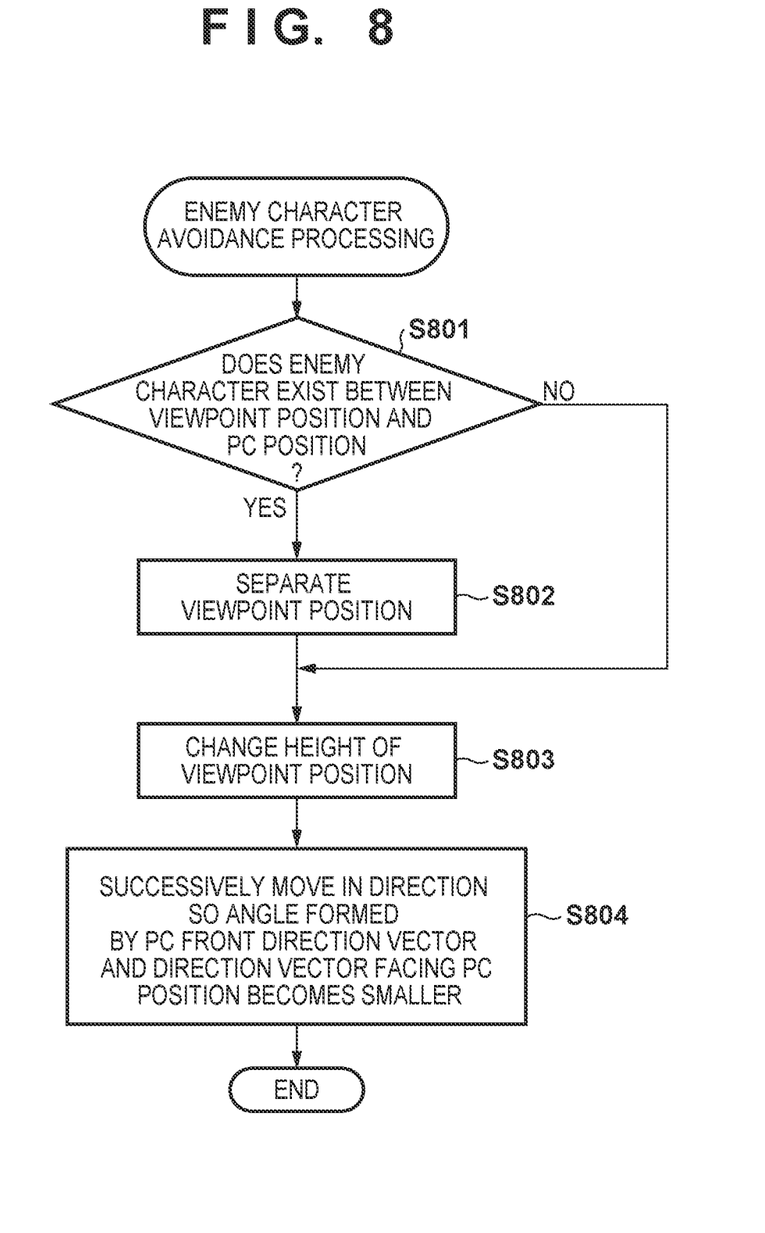
FIG. 8 is a flowchart for showing an example of enemy character avoidance processing according to a third embodiment of the present invention.

Hereinafter, using the flowchart of FIG. 8, explanation is given of details for details of enemy character avoidance processing for control of viewpoint position in accordance with the existence of an enemy character.

In step S801, the control unit 101 determines whether or not an enemy character exists between the viewpoint position and the PC position. The determination of this step, similarly to step S501 of the BG avoidance processing, may be performed according to whether 4 raycasts from vertices of a rectangle that expands the near plane defined for the PC position collide with a determination collision detection volume disposed in order to determine occlusion by a character object. The control unit 101 moves the processing to step S802 in cases where it determines that an enemy character is present between the viewpoint position and the PC position, and moves the processing to step S803 in cases where it determines that one is not present.

In step S802, the control unit 101 obtains a distance between the PC and the enemy character existing between the viewpoint position and the PC position as the shortest distance from the origin of the raycast to the collision point in step S801, and causes the viewpoint position to move in a direction that causes separation from, the PC position in accordance with that distance, and the size of the enemy character which is the battle opponent. In other words, if the distance to the enemy character is small, it is possible that the visibility of the PC is reduced by the enemy character, and also, if the enemy character is large, it is possible that the visibility of the PC is particularly reduced.

Also, in step S803, the control unit 101 changes a tilt angle by raising the height of the viewpoint position, in accordance with whether the enemy character is a character determined as a large-type such as where its height in a vertical direction is larger than that of the PC, for example, and the number of enemy characters of the same type that exist in a vicinity of the PC. That is, if there is a large-type enemy character, the PC cannot be caused to be seen simply by separating by the processing of step S802, and further if the same type of enemy character exist in a crowd, it is impossible to see a player character particularly that exists separated from, the viewpoint position, more than the enemy characters if not from an overlooking viewpoint. Accordingly, the control unit 101 changes a vertical position of the viewpoint position in accordance with the size and degree of crowding of the enemy characters.

Also, because a situation in which it is difficult to manipulate for the player arises if an enemy character exists between the viewpoint position and the PC position, or if the PC is facing in the direction of the viewpoint position, in step S804, the control unit 101 control is performed in a case where a vector defining a PC front direction and a direction vector facing the PC position from the viewpoint position are located so as to form an angle greater than or equal to a predetermined value such as greater than or equal to 90 degrees in a horizontal plane, to move the viewpoint position in a direction such that the successive angles becomes smaller.

In this way, it is possible to perform control of the viewpoint position so that suitable screen rendering is performed even in a situation in which a character such as a battle opponent or the like should not be caused to fade.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. Also, the information processing apparatus and the control method of the information processing apparatus according to the present invention are realizable by a program executing the methods on one or more computers. The program, is providable/distributable by being stored on a computer-readable storage medium, or through, an electronic communication line.

This application claims the benefits of Japanese Patent Applications No. 2015-052750, filed Mar. 16, 2015, and No. 2016-043912, filed Mar. 7, 2016, which are hereby incorporated by reference herein in their entireties.

What is claimed is:

1. A non-transitory computer-readable storage medium storing a program that causes a computer connected to a renderer for rendering a screen in which objects are located in a scene to execute:

processing of obtaining a viewpoint position for rendering the scene;

processing of deciding a gaze point for rendering of the scene based on a position of a reference object that is a reference for rendering, a position of the gaze point being decided as a position different from the position of the reference object;

first determination processing of determining whether a background object is included in a predetermined volume defined between the obtained viewpoint position and the reference object;

processing of changing, if the background object is determined to be included in the predetermined volume by the first determination processing, the viewpoint position to a viewpoint candidate position defined based on the background object; and processing of moving, after changing the viewpoint position to the viewpoint candidate position, the viewpoint candidate position in a vertical direction so as to increase a distance between the viewpoint candidate position and the reference object, if a distance between the viewpoint candidate position and the gaze point is less than a predetermined distance.

2. The non-transitory computer-readable storage medium according to claim 1, wherein the first determination processing determines whether the background object is included in the predetermined volume in accordance with whether parallel straight lines, that extend in a direction toward the viewpoint position from the position of the reference object from each vertex of a rectangle defined based on an angle of view to render and the position of the reference object, intersect with a collision detection volume of the background object.

3. The non-transitory computer-readable storage medium according to claim 2, wherein the rectangle and a near clipping plane define a truncated four-sided pyramid, with the rectangle having a larger area than the near clipping plane.

4. The non-transitory computer-readable storage medium according to claim 2, wherein the processing of changing sets, from among at least one point of intersection between the parallel straight lines and the collision detection volume of the background object, a point of intersection closest to the reference object as the viewpoint candidate position.

5. The non-transitory computer-readable storage medium according to claim 1, wherein the program further causes the computer to execute second determination processing of determining, if it is determined by the first determination processing that the background object is included in the predetermined volume, whether a viewpoint movement to bypass the background object in either a left horizontal direction or a right horizontal direction is possible.

6. The non-transitory computer-readable storage medium according to claim 5, wherein the second determination processing, for multiple points located in a leftward direction and a rightward direction from the viewpoint position on predetermined tracks that pass through the viewpoint position and a vicinity of the reference object with the position of the reference object as a reference, determines that the viewpoint movement for bypassing the background object is possible in either the left horizontal direction or the right horizontal direction if straight lines connecting each of the multiple points with the reference object and a straight line connecting an adjacent point from the multiple points and the viewpoint position all do not intersect a collision detection volume of the background object.

7. The non-transitory computer-readable storage medium according to claim 5, wherein the second determination processing determines the viewpoint movement for bypassing the background object is impossible if it determines that there is a collision between a collision detection volume defined for the viewpoint position and a collision detection volume of the background object.

8. The non-transitory computer-readable storage medium according to claim 1, wherein the processing of deciding further decides, if the viewpoint candidate position is moved in the vertical direction, a new gaze point so that a vector defined by the viewpoint candidate position before the moving and the gaze point is maintained.

9. The non-transitory computer-readable storage medium according to claim 1, wherein the processing of deciding further decides, if a straight line connecting the position of the reference object and the gaze point intersects a collision detection volume of the background object, a new gaze point at a new position closer to the position of the reference object than the position of the gaze point.

10. The non-transitory computer-readable storage medium according to claim 9, wherein the processing of deciding further decides, for multiple points located in a leftward direction and a rightward direction from the viewpoint position on predetermined tracks that pass through the viewpoint position and a vicinity of the reference object with the position of the reference object as a reference, if a collision volume defined by at least two of the multiple points collides with the collision detection volume of the background object, a new gaze point at a position closer to the position of the reference object than the gaze point.

11. An information processing apparatus connected to a renderer for rendering a screen in which objects are located in a scene, the information processing apparatus comprising:
   a processor; and
   a memory including instructions that, when executed by the processor, cause the processor to perform operations including:
      obtaining a viewpoint position for rendering the scene;
      deciding a gaze point for rendering of the scene based on a position of a reference object that is a reference for rendering, a position of the gaze point being decided as a position different from the position of the reference object;
      determining whether a background object is included in a predetermined volume defined between the viewpoint position and the reference object;
      changing, if the background object is determined to be included in the predetermined volume, the viewpoint position to a viewpoint candidate position defined based on the background object; and
      moving, after changing the viewpoint position to the viewpoint candidate position, the viewpoint candidate position in a vertical direction so as to increase a distance between the viewpoint candidate position and the reference object, if a distance between the viewpoint candidate position and the gaze point is less than a predetermined distance.

12. A method of controlling an information processing apparatus connected to a renderer for rendering a screen in which objects are located in a scene, the method comprising:
   obtaining a viewpoint position for rendering the scene;
   deciding a gaze point for rendering of the scene based on a position of a reference object that is a reference for rendering, a position of the gaze point being decided as a position different from the position of the reference object;
   determining whether a background object is included in a predetermined volume defined between the obtained viewpoint position and the reference object;
   changing, if the background object is determined to be included in the predetermined volume, the viewpoint position to a viewpoint candidate position defined based on the background object; and
   moving, after changing the viewpoint position to the viewpoint candidate position, the viewpoint candidate position in a vertical direction so as to increase a distance between the viewpoint candidate position and the reference object, if a distance between the viewpoint candidate position and the gaze point is less than a predetermined distance.

* * * * *